United States Patent
Michaelis

(10) Patent No.: US 7,177,417 B2
(45) Date of Patent: Feb. 13, 2007

(54) TELEPHONE HANDSET WITH USER-ADJUSTABLE AMPLITUDE, DEFAULT AMPLITUDE AND AUTOMATIC POST-CALL AMPLITUDE RESET

(75) Inventor: Paul R. Michaelis, Louisville, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 812 days.

(21) Appl. No.: 09/976,217

(22) Filed: Oct. 11, 2001

(65) Prior Publication Data

US 2003/0072434 A1 Apr. 17, 2003

(51) Int. Cl.
*H04M 1/00* (2006.01)

(52) U.S. Cl. ............ 379/395; 379/388.03; 379/388.06; 379/390.01; 379/390.03

(58) Field of Classification Search ................ 379/52, 379/387.01, 388.03, 388.06, 390.01, 390.03, 379/395
See application file for complete search history.

(56) References Cited

U.S. PATENT DOCUMENTS

| 4,466,120 A | 8/1984 | Walker, Jr. et al. ......... 381/109 |
| 4,773,088 A * | 9/1988 | Matheny ..................... 379/395 |
| 4,926,459 A | 5/1990 | Advani et al. ................ 379/52 |
| 4,977,609 A | 12/1990 | McClure ...................... 455/89 |
| 5,150,404 A * | 9/1992 | Jordan ......................... 379/395 |
| 5,195,132 A | 3/1993 | Bowker et al. |
| 5,539,806 A * | 7/1996 | Allen et al. ................... 379/52 |
| 5,737,389 A | 4/1998 | Allen ............................ 379/1 |
| 5,802,164 A * | 9/1998 | Clancy et al. .............. 379/347 |
| 6,061,431 A * | 5/2000 | Knappe et al. ................ 379/52 |
| 6,807,262 B1 * | 10/2004 | Goldman .................... 379/157 |

FOREIGN PATENT DOCUMENTS

JP 02001036613 A 2/2001

OTHER PUBLICATIONS http://web.archive.org/web20010414083806/http://www.seniorshops.com/clarity1000.html, 1999.

* cited by examiner

*Primary Examiner*—Jefferey F. Harold
(74) *Attorney, Agent, or Firm*—Sheridan Ross P.C.

(57) ABSTRACT

The present invention is directed to a telecommunication device, usable with standard telecommunication equipment, that automatically resets one or more acoustic parameters to predetermined levels prior to the initiation of the next communication session.

22 Claims, 2 Drawing Sheets

TELEPHONE HANDSET WITH USER-ADJUSTABLE AMPLITUDE, DEFAULT AMPLITUDE AND AUTOMATIC POST-CALL AMPLITUDE RESET

FIELD OF THE INVENTION

The present invention is directed to telecommunication devices generally and to user adjustable telecommunication devices specifically.

BACKGROUND OF THE INVENTION

Many governmental entities are now requiring handheld telephony devices to include user adjustable features for disabled or handicapped employees, such as the hearing impaired. Section 508 of the Workforce Investment Act of 1998, for example, is intended to make communication systems accessible to hearing impaired employees of the U.S. government. The Act imposes mandatory procurement requirements on the government. Two such requirements are:

(i) for transmitted voice signals, telecommunications products shall provide a gain adjustable up to a minimum of 20 db and, for incremental volume control, at least one intermediate step of 12 db of gain shall be provided; and (ii) if the telecommunications product allows a user to adjust the receive volume, a function shall be provided to automatically reset the volume to the default level after every use.

Existing handheld telecommunication devices are generally noncompliant with these provisions. For example, the typical office telephone offers a maximum gain of 12 dB. The typical residential telephone offers no ability to adjust the gain. Even on telephones that permit the gain to be adjusted by the user, automatic post-call reset to a default level is generally not provided.

No new technologies would be required to design and build telecommunication devices, such as telephones, that provide the desired capabilities. The engineering challenge is to find an economical way to bring existing telecommunication devices and systems into compliance.

One obvious way to provide 20 dB of gain, with automatic post-call reset, is to boost the output of the private Branch Exchange (PBX), Central Office Switch, or other centralized device that is serving a plurality of users. What makes this approach impractical is that standard encoding and transmission algorithms, such as 64-Kilobit Pulse Code Modulation or 13.2-Kilobit GSM, do not have 20 dB of "headroom" available. Attempts to boost transmission gain by more than 12 dB often results in unacceptable distortion, similar to what is experienced when an inexpensive radio is turned up too loud.

The other obvious solution is to upgrade the amplifiers in the endpoint devices themselves, so that they provide 20 dB of gain and automatic post-call reset. Although there are no technical barriers to this approach, the costs of replacing the amplifier modules in existing telephones, coupled with the costs of modifying all existing production lines, make this approach impractical.

SUMMARY OF THE INVENTION

These and other needs are addressed by the telecommunications device and method of the present invention. Generally, the telecommunications device resets automatically an acoustic characteristic (e.g., volume) to a desired or selected level before the next communication session, such as when the telecommunications device is in the on- or off-hook state. In one configuration, the device is a handset, which can be used by any existing telephone that has standard electronics and a modular handset cord. Regardless of where the level of the acoustic characteristic is set by a user during a call, the handset reverts automatically to a default value or level upon completion of the call.

In one embodiment, a method for operating a telecommunications device, is provided that includes the steps of:

(a) monitoring the telecommunications device for an on- or off-hook state (e.g., during a telephone call); and (b) when the on- or off-hook state is detected, automatically resetting an acoustic characteristic (e.g., volume or gain) to a predetermined level. The predetermined level can be programmed by the user.

When the telecommunications device is in the off-hook state, the acoustic characteristic is freely adjustable by a user. As used herein, the "on hook" state refers to the operational mode in which a telecommunications device is deactivated (or disabled) for voice communication purposes, and the "off hook" state refers to the operational mode in which a telecommunications device is activated (or enabled) for voice communication purposes. The off hook state thus does not include the activation of the handset solely for the purpose of entering or storing information (e.g., telephone numbers, names, addresses, etc.) in the memory of the device and/or for transmitting nonvoice signals.

The acoustic characteristic can be any suitable characteristic, such as one or more of volume, frequency response contour, and audio compression. The acoustic characteristic can be associated with at least one of a receive signal, a transmit signal, and a side tone signal.

The monitoring step typically is performed by comparing an electrical parameter of the telecommunications device to a predetermined value.

When the on- or off-hook state is detected, a solid state configuration of the present invention alters the state of a state indicator or flag from a first value to a second, different value. When the altered state or value of the state indicator is detected, the processor resets automatically the acoustic parameter to the predetermined level.

The automatic reset of the acoustic characteristic can not only satisfy federal procurement requirements but also represent a safety enhancement. Even if the amplitude is adjusted dramatically upward during a call (e.g., either because the user is hearing impaired or the signal is weak), there is a reduced likelihood that the volume on the subsequent call will surprise or harm users by starting at unsafe levels.

The method can include other steps depending on the application. For example, the method can include the further steps of:

(c) monitoring the telecommunications device for the other of the on- or off-hook state; and (d) when the other state is detected, performing steps (a) and (b) above.

In another embodiment, a telecommunications device is provided that includes:

a state detector that detects the on- or off-hook state of the telecommunications device; and when the on- or off-hook state is detected, an automatic reset that automatically resets an acoustic characteristic of the telecommunications device to a predetermined or default level. As noted, the state detector monitors the telecommunications device for the other state and when the other state is detected, the state detector then monitors the telecommunications device for the on- or off-hook state. In one configuration, the automatic reset components are in the handset to permit handsets to be exchanged as a simple and inexpensive way to bring a phone into compliance with federal regulations.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
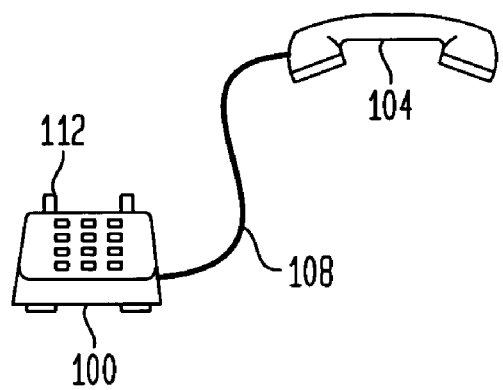
FIG. 1 depicts a telecommunications device incorporating the subject invention.
Figure 2:
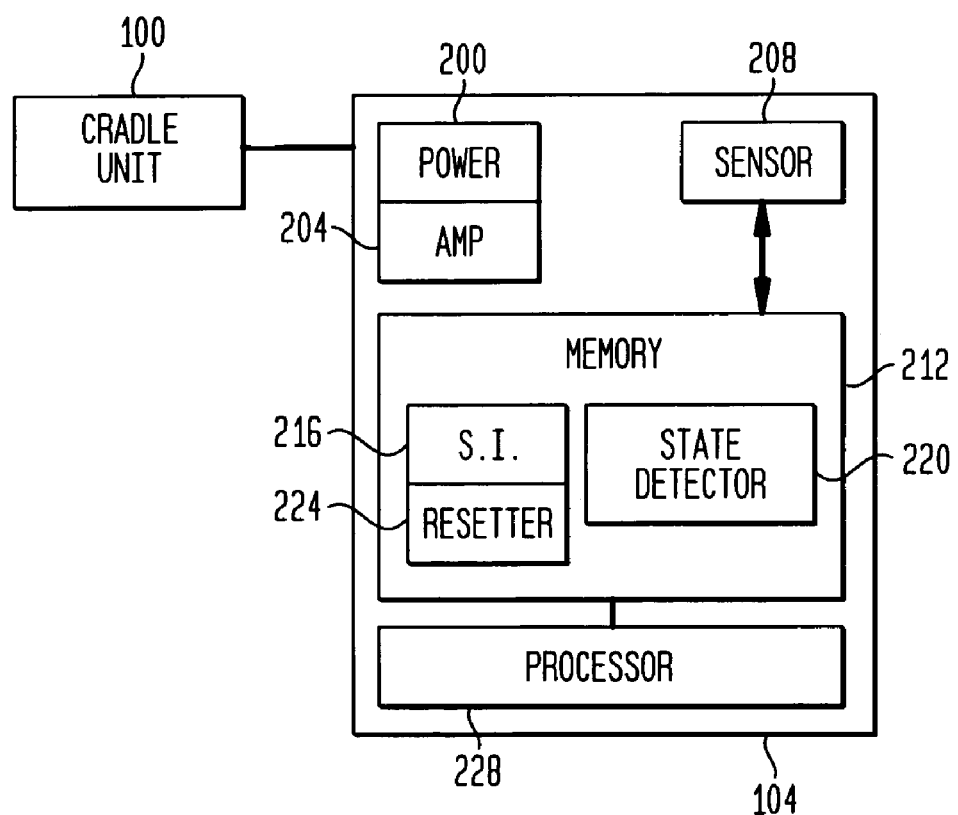
FIG. 2 is an schematic of components in the handset of the telecommunications device.

FIGS. 1 and 2 depict a voice-based telecommunications device incorporating an embodiment of the subject invention. The telecommunication device includes a cradle unit 100 and a handset 104 in electrical communication with the cradle. As will be appreciated, when the handset is off-hook, or in the off-hook state (shown in FIG. 1), electrical energy flows through the handset 104 such as from the cradle unit 100 through cord 108. When the handset is on-hook, or in the on-hook state (not shown), the handset rests in the cradle 112 of the cradle unit 100 and no or significantly less electrical energy flows through the handset 104.

Although a corded handset is depicted, it will be appreciated that the handset can be any suitable voice-based design, such as cordless, corded or wireless. The "handset" can be handheld or head-held, such as a headset with a boom microphone. The handset can receive digital and/or analog signals.

FIG. 2 shows some of the components in the handset 104. As will be appreciated, there are a number of components in the handset that are not shown in FIG. 2, such as the microphone and speaker and corresponding circuitry and the side tone circuitry. Referring to FIG. 2, the handset 104 includes a power source 200 (optional), an amplifier 204, a sensor 208 to measure an electrical parameter (e.g., voltage or amperage) associated with the flow of electrical energy through the handset 104, memory 212 containing a state indicator 216 associated with the on-hook or off-hook state, state detector 220 to receive signals from sensor 208 and determine based thereon the state of the telecommunications device, and resetter 224 to reset an acoustic parameter (e.g., volume, frequency response contour, and audio compression associated with one or more of the receive signal, the transmit signal, and/or the side tone signal), and finally a processor 228 to execute the algorithms associated with the state detector 220 and resetter 224.

The power source 200 is primarily intended to provide power to processor 228 when the handset is in the on-hook state when little or no electrical energy flows through the handset 104. The power source 200 can be any suitable source of electrical energy, such as a capacitor (which stores electrical energy received when the handset is in the off-hook state), a battery, hard-wired external power source, or inductively coupled external power source.

The amplifier 204 can be any suitable amplification device that is capable of producing a signal gain of the desired level. As noted, the amplifier will typically be required to provide a gain adjustable up to a minimum of 20 db and provide incremental gain control of at least one intermediate step of 12 db of gain.

The sensor 208 can be any suitable device for measuring one or more desired electrical parameters. Examples of suitable sensors include voltage, amperage, and electric resistance detectors.

Figure 3:
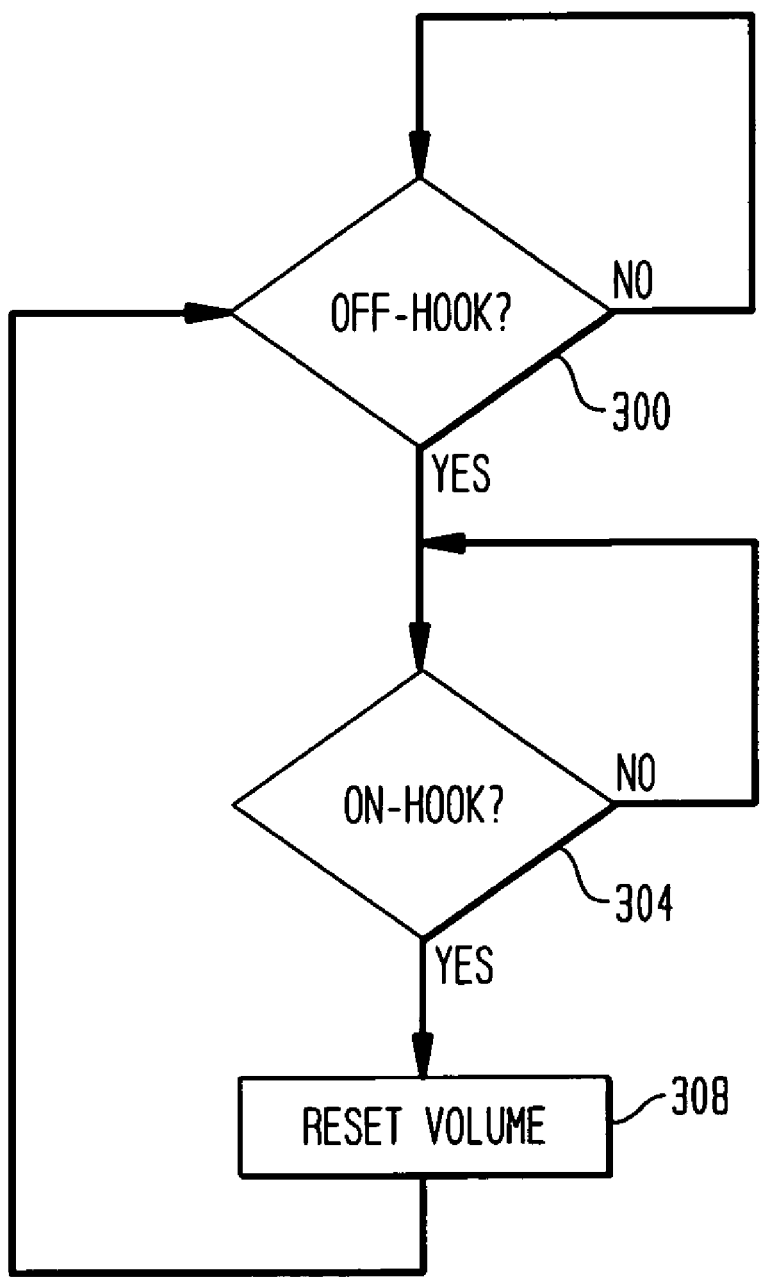
FIG. 3 is a flow schematic of the operation of an algorithm according to one embodiment of the present invention.

The operation of the telecommunications device will now be discussed with reference to FIG. 3. The processor 228 in step 300 first determines whether or not the handset 104 is in the off-hook state. This is done by comparing the electrical parameter measured by sensor 208 with a predetermined value. If the measured electrical parameter equals or exceeds the predetermined value, the handset is determined to be in the off-hook state. Conversely, if the measured electrical parameter is less than the predetermined value, the handset is determined to be in the on-hook state. If the handset is in the on hook state, the processor repeats to step 300 until an off hook state is identified. If the handset is in the off hook state, the processor sets state indicator 216 to indicate the offhook state and proceeds to step 304.

In step 304, the processor determines whether the handset is in the on hook state. As in the case of the prior step, this is done by comparing the electrical parameter measured by sensor 208 with a predetermined value. If the measured electrical parameter is less than the predetermined value, the handset is determined to be in the on-hook state. Conversely, if the measured electrical parameter is equal to or exceeds the predetermined value, the handset is determined to be in the off-hook state. If the handset is in the off hook state, the processor repeats to step 304 until an on hook state is identified. If the handset is in the on hook state, the processor sets the state indicator to indicate the on hook state and proceeds to step 308.

As will be appreciated, the user of the handset can freely set the acoustic parameter to any desired level when the handset is off hook. This can be done by any suitable techniques that will be known to those of ordinary skill in the art. For example, one or more push buttons or a dial can be used to adjust the acoustic parameter to desired levels.

In step 308, the acoustic parameter, which is shown as being a volume level associated with the transmit, receive or side tone signal, is automatically reset to a predetermined level whenever the state indicator 216 corresponds to the on hook state. The predetermined level is typically a default (fixed) level set by the manufacturer or equipment supplier. The level is generally selected such that a non-hearing impaired user who picks up the handset will not experience discomfort or physical injury from the default setting of the acoustic parameter.

A number of variations and modifications of the invention can be used. It would be possible to provide for some features of the invention without providing others. For example in other alternative embodiments, the resetting of the acoustic parameter is performed electrically (e.g., by means of a silicon chip or ASICS), electronically (e.g., by means of a potentiometer, and/or electromechanically (such as by means of an electromechanical relay). In another alternative embodiment, the reset operation is performed on one or more acoustic characteristics of a receive, transmit, and/or side tone signal. In yet another embodiment, the reset level of the acoustic characteristic is user adjustable or programmable. The automatic reset can occur when the handset goes on-hook (ending the current phone call) and/or when the phone goes off-hook (starting a new phone call). In the latter case, the automatic reset typically occurs immediately after the off-hook state is detected or before the user resets or adjusts the acoustic parameter.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for operating a voice-based telecommunications device, comprising:
   (a) monitoring the voice-based telecommunications device for at least one of an on-hook and off-hook state; and
   (b) when the at least one of an on-hook and off-hook state is detected, automatically resetting at least one acoustic characteristic to a predetermined level, the acoustic characteristic capable of being associated with at least one of a transmit signal and a sidetone signal.

2. The method of claim 1, wherein the at least one of an on-hook and off-hook state is the off-hook state, wherein, when the telecommunications device is in an off-hook state, the acoustic parameter is freely adjustable by a user and wherein the acoustic parameter comprises a volume setting of a speaker of the device and further comprising:
   (c) monitoring the voice-based telecommunications device for the off-hook state; and
   (d) when the off-hook state is detected, performing steps (a) and (b).

3. The method of claim 1, wherein the at least one of an on-hook and off-hook state is the on-hook state, wherein, when the telecommunications device is in an off-hook state, the acoustic parameter is freely adjustable by a user, and wherein the acoustic parameter comprises a volume setting of a speaker of the device and further comprising:
   (c) monitoring the voice-based telecommunications device for the on-hook state; and
   (d) when the on-hook state is detected, performing steps (a) and (b).

4. The method of claim 1, wherein the monitoring step (a) comprises comparing a magnitude of an electrical parameter of the voice-based telecommunications device to a predetermined value, wherein the electrical parameter is an electrical current flowing to a handset of the device, and, further comprising:
   (c) when the at least one of the on-hook and off-hook state is detected, altering the state of a state indicator; and wherein the resetting step (b) comprises detecting the altered state of the state indicator and resetting the acoustic parameter to the predetermined level in response thereto.

5. The method of claim 1, wherein the acoustic parameter is a frequency contour of acoustic signals handled by one or more of the, transmit and sidetone channels of the voice-based telecommunications device.

6. The method of claim 1, wherein the acoustic parameter is audio compression level of one or more of the transmit and sidetone signals.

7. The method of claim 1, wherein the acoustic parameter is an acoustic parameter selected from the at least one of the volume, frequency contour and audio compression level of at least one of the transmit signal and the sidetone signal.

8. A method for operating a voice-based telecommunications device, comprising:
   (a) monitoring the voice-based teleconununications device for at least one of an on-hook and off-hook state; and
   (b) when the at least one of an on-hook and off-hook state is detected, automatically resetting at least one acoustic characteristic to a predetermined level, wherein:
      the acoustic parameter is an acoustic parameter selected from the at least one of the volume, frequency contour and audio compression level of at least one of a transmit signal and a sidetone signal, and
      the at least one of the transmit signal and sidetone signal is both of transmit and sidetone signals and the setting of the acoustic parameter of the sidetone signal is independent of the acoustic parameter setting of the transmit signal.

9. A method for operating a voice-based telecommunications device, comprising:
   (a) monitoring the voice-based teleconununications device for at least one of an on-hook and off-hook state; and
   (b) when the at least one of an on-hook and off-hook state is detected, the voice-based telecommunications device is capable of automatically resetting to a predetermined level at least one of:
      (i) a frequency contour of at least one of transmit and sidetone signals,
      (ii) an audio compression level of any of the at least one of transmit and sidetone signals,
      (iii) a volume level of at least one of a transmit signal and sidetone signal, wherein in (iii), a volume setting of the at least one of the transmit signal and sidetone signal are independent of each other, and
      (iv) a volume level, wherein the predetermined level is user adjustable.

10. The method of claim 9, wherein, in step (a), the at least one of the on-hook and off-hook states is the on-hook state and further comprising:
   (c) monitoring the voice-based telecommunications device for the on-hook state; and
   (d) when the on-hook state is detected, performing steps (a) and (b).

11. The method of claim 9, wherein, in step (a), the at least one of the on-hook and off-hook states is the off-hook state and further comprising:

(c) monitoring the voice-based teleconunnunications device for the off-hook state; and (d) when the off-hook state is detected, performing steps (a) and (b).

12. The method of claim 9, wherein the at least one of: (i) a frequency contour of at least one of transmit and sidetone signals, (ii) an audio compression level of any of the at least one of transmit and sidetone signals, and (iii) a volume level of at least one of a transmit signal and sidetone signal is (i).

13. The method of claim 9, wherein the at least one of: (i) a frequency contour of at least one of transmit and sidetone signals, (ii) an audio compression level of any of the at least one of transmit and sidetone signals, and (iii) a volume level of at least one of a transmit signal and sidetone signal is (ii).

14. The method of claim 9, wherein the at least one of: (i) a frequency contour of at least one of transmit and sidetone signals, (ii) an audio compression level of any of the at least one of transmit and sidetone signals, and (iii) a volume level of at least one of a transmit signal and sidetone signal is (iii).

15. The method of claim 9, wherein the predetermined level is user configurable.

16. A voice-based telecommunications device, comprising:

(a) a state detector that detects at least one of an off-hook and on-hook state of the telecommunications device; and (b) an automatic reset capable of operating, when the at least one of an off-hook and on-hook state is detected, to reset automatically to a predetermined level at least one of:

(i) a frequency contour of at least one of transmit and sidetone signals, (ii) an audio compression level of any of the at least one of transmit and sidetone signals, and (iii) a volume level of at least one of a transmit signal and sidetone signal, wherein in (iii), a volume setting of the at least one of the transmit signal and sidetone signal are independent of one another.

17. The device of claim 16, wherein the at least one of the on-hook and off-hook states is the on-hook state.

18. The device of claim 16, wherein the at least one of the on-hook and off-hook states is the off-hook state.

19. The device of claim 16, wherein the at least one of: (i) a frequency contour of at least one of transmit and sidetone signals, (ii) an audio compression level of any of the at least one of transmit and sidetone signals, and (iii) a volume level of at least one of a transmit signal and sidetone signal is (i).

20. The device of claim 16, wherein the at least one of: (i) a frequency contour of at least one of transmit and sidetone signals, (ii) an audio compression level of any of the at least one of transmit and sidetone signals, and (iii) a volume level of at least one of a transmit signal and sidetone signal is (ii).

21. The device of claim 16, wherein the at least one of: (i) a frequency contour of at least one of transmit and sidetone signals, (ii) an audio compression level of any of the at least one of transmit and sidetone signals, and (iii) a volume level of at least one of a transmit signal and sidetone signal is (iii).

22. The device of claim 16, wherein predetermined level is user configurable.

* * * * *